(12) United States Patent
Young

(10) Patent No.: US 9,941,801 B2
(45) Date of Patent: Apr. 10, 2018

(54) SWITCHED MODE AC-DC CONVERTER

(71) Applicant: Eisergy Limited, Dublin (IE)

(72) Inventor: George Young, Dublin (IE)

(73) Assignee: Icergi Limited, Dublin (IE)

( * ) Notice: Subject to any disclaimer, the term of this patent is extended or adjusted under 35 U.S.C. 154(b) by 0 days.

(21) Appl. No.: 15/125,957

(22) PCT Filed: Mar. 13, 2015

(86) PCT No.: PCT/EP2015/055352
§ 371 (c)(1),
(2) Date: Sep. 13, 2016

(87) PCT Pub. No.: WO2015/136097
PCT Pub. Date: Sep. 17, 2015

(65) Prior Publication Data
US 2017/0126134 A1 May 4, 2017

(30) Foreign Application Priority Data
Mar. 14, 2014 (GB) .................................. 1404655.1

(51) Int. Cl.
*H02M 3/335* (2006.01)
*H02M 1/42* (2007.01)
(Continued)

(52) U.S. Cl.
CPC ......... *H02M 3/33507* (2013.01); *H02M 1/08* (2013.01); *H02M 1/4241* (2013.01); *H02M 1/44* (2013.01); *H02M 2001/0096* (2013.01)

(58) Field of Classification Search
CPC ....... H02M 2001/0096; H02M 1/4241; H02M 1/4258; H02M 3/335; H02M 3/33507;
(Continued)

(56) References Cited

U.S. PATENT DOCUMENTS 6,344,979 B1    2/2002  Huang et al.
7,184,280 B2 *  2/2007  Sun ................... H02M 3/33592
                                                         363/127
(Continued)

FOREIGN PATENT DOCUMENTS

EP    2110937 A1   10/2012
GB    2452318 A    3/2009

OTHER PUBLICATIONS

Youssef, et al., "A Novel Single Stage AC-DC Self-Oscillating Series-Parallel Resonant Converter", IEEE Transactions on Power Electronics, Nov. 2006, pp. 1735-1744, vol. 21, No. 6.
(Continued)

*Primary Examiner* — Gary L Laxton
(74) *Attorney, Agent, or Firm* — Charles A. Lemaire; Jonathan M. Rixen; Lemaire Patent Law Firm, P.L.L.C.

(57) ABSTRACT

A class of switching power supplies that use a resonant isolation stage (typically LLC) fed directly or via a diode bridge from the line. Extension of the range of available gain values over frequency without material loss of efficiency is facilitated by usage of additional resonant elements. This capability allows the devices to provide narrow-range inputs to secondary-processing circuits, with the ability to achieve power factor correction if required. The conversion architecture is also compatible with optimal usage of energy storage elements suitable for use with switching power supplies.

25 Claims, 11 Drawing Sheets

(51) Int. Cl.
*H02M 1/44* (2007.01)
*H02M 1/08* (2006.01)
*H02M 1/00* (2006.01)

(58) Field of Classification Search
CPC .......... H02M 3/33523; H02M 3/33553; Y02B 70/1416; Y02B 70/1433; Y02B 70/14815
See application file for complete search history.

(56) References Cited

U.S. PATENT DOCUMENTS

| | | | |
|---|---|---|---|
| 7,660,133 B1 | 2/2010 | Hwang et al. | |
| 8,134,851 B2 | 3/2012 | Soldano et al. | |
| 8,705,252 B2 | 4/2014 | Duvnjak | |
| 2010/0259954 A1* | 10/2010 | Santoro ................... | H02M 1/36 363/21.02 |
| 2010/0265741 A1 | 10/2010 | Usui | |
| 2012/0020119 A1* | 1/2012 | Tang ..................... | H02M 1/425 363/21.02 |

OTHER PUBLICATIONS

Schutten, et al., "Characteristics of load resonant converters operated in a high power factor mode", APEC '91, Conference Proceedings, 1991., Sixth Annual., 1991, pp. 5-16.
"U.K. Combined Search and Examination Report for priority Application GB 1404655.1 (7 pages).", Sep. 16, 2014.

* cited by examiner

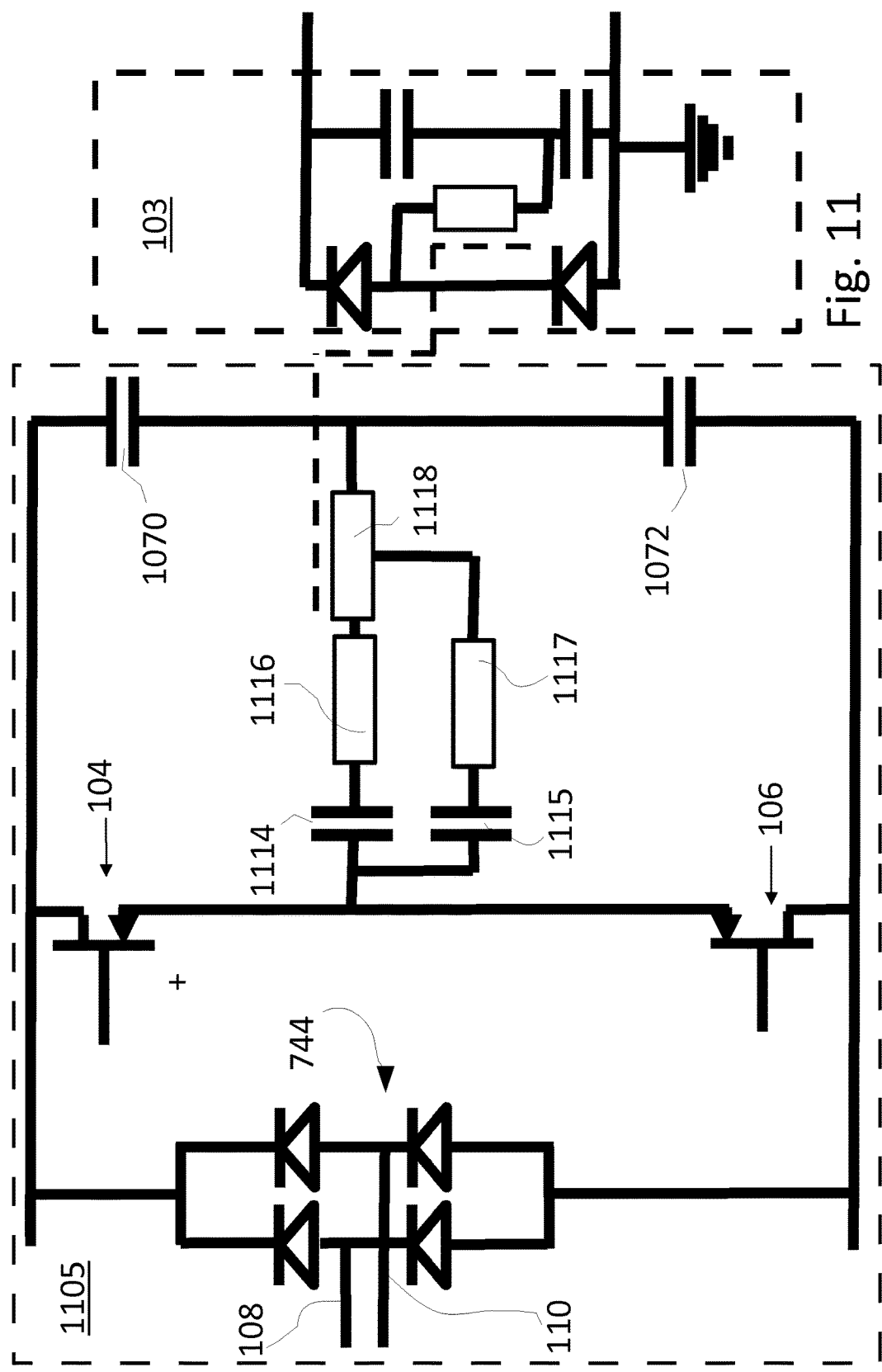

SWITCHED MODE AC-DC CONVERTER

FIELD OF THE APPLICATION

The present application relates to switching power supplies and in particular to AC-DC switching converters employing an isolated resonant initial conversion stage, typically implemented using an LLC approach.

BACKGROUND

The present application is directed to AC-DC mains fed power supplies which convert an incoming AC line voltage (which may be nominally 100 Volts to 240 Volts having a frequency of 60 or 50 Hz) to a DC output voltage. The DC output is typically a low voltage of less than 60 volts. Certain applications however provide a higher DC voltage output but require galvanic isolation including for example lighting application. These types of supplies are used to power computers and other electronic equipment and generally provide a power output of less than 500 Watts. The present application is directed at universal power supplies where the supply is designed to work from a nominal 100 Volt to 240 Volt supply at either 50 or 60 Hz. Accordingly, the converters to which the present application is directed are wide input voltage converters intended to operate from an input RMS voltage of 90V to 264V AC at either 50 Hz or 60 Hz. This design constraint is not inconsequential. There is a general push for improved performance across a wide variety of different performance criteria. These criteria include for example efficiency, reliability, Power Factor, EMI, size and cost. Generally there is a balance to be made, for example improving efficiency may increase cost or necessitate a larger EMI filter to meet EMI performance requirements. Thus depending on the particular application and requirements, different types of converter may be employed and a variety of different approaches are known in the art.

For example, a simple form, if a high power factor is not important, comprises a rectifier bridge employed directly to feed a bulk capacitor to which a switching DC-DC converter may be connected. However, apart from a low Power Factor other problems associated with such a design include the general need to limit surge current. Accordingly, the use of such designs tends to be limited to low power arrangements.

For higher powers, there are a number of possibilities, some of which will be discussed below. However generally there are two conventional approaches used in switching AC-DC converters. The first approach uses an isolated flyback converter. The advantage of using an isolated flyback converter is that it has inherently high power factor by virtue of its manner of operation without the need for a specific Power Factor Correction (PFC) circuit. However, it suffers from a number of disadvantages including the need for high voltage switches.

The more conventional approach uses an initial (typically boost) stage as a front end converter which, provides a relatively high DC voltage which is held by a "bulk" electrolytic capacitor. A second stage is employed then to convert the DC voltage to the required lower output voltage. The second stage generally provides isolation in the form of a transformer to isolate the high voltage mains AC side from the lower DC output side.

The required capacitance value is determined by the extent to which the voltage across the bulk, usually an electrolytic, capacitor value is designed to be allowed to drop and this in turn determines the design details associated with the isolation stage. More generally, a designer might start with the design of the isolation stage and work backwards to determine the size of capacitor value required.

It is generally accepted that designing isolation stages for high conversion ratios will involve a compromise in terms of efficiency. The symmetrical LLC converter is widely used and is more immune than most converters in this context, in that it operates close to optimal operating conditions—near the series resonant frequency—under normal operation, and the boosting function (involving lower efficiency) is required only in the few milliseconds where such operation is required. However, whilst the advantage of the LLC converter in these situations is that they are extremely efficient, a disadvantage is that the efficiency is generally at the expense of gain range and their Q factors tend to be relatively low. The net result of which is that they are designed to operate over a relatively narrow input voltage range, which necessitates a reasonably high value of bulk capacitor at their input. There are some known variations on the theme of a boost converter followed by an LLC converter. For example, US20120262954 discloses an arrangement in which a boost converter output is provided to an LLC converter and in which the switching of the LLC converter is provided by the arrangement of the boost converter.

More particularly, in the LLC design, the transformer is typically implemented on a core of low effective permeability to achieve a relatively low value of magnetising inductance. However, designing an LLC converter to operate over a very wide voltage range may involve compromise in terms of requiring excess Q in normal operation, with consequent excessive circulating current and associated losses. So whilst operating over a very wide voltage range may appear to offer an advantage with respect to the reduction of the required capacitor value there are disadvantages to such an approach.

Whilst the PFC stage along with an LLC, flyback or forward-derived isolation stage are the preferred arrangements for AC-DC converters, a variety of other arrangements have been proposed. These alternatives include the isolated boost arrangement. This is basically a combination of a standard boost converter followed by a four-way switched synchronised bridge that works through a transformer to feed energy storage capacitance on the secondary side. Whilst, this configuration offers some advantages, it is generally not employed because of problems associated with start-up, component utilisation and transformer design issues.

Another proposed approach employs LCC resonant converters. Examples of such are described in Schutten et al, "Characteristics of load resonant converters operated in a high power factor mode", Applied Power Electronics Conference and Exposition, 1991. APEC '91. Conference Proceedings, 1991, Sixth Annual. In this arrangement, a LCC converter is employed as an AC-DC converter. The advantage of the converter is high efficiency. This converter is however not optimised for universal line input. Another approach, Youssef and Jain, "A Novel Single Stage AC-DC Self-Oscillating Series-Parallel Resonant Converter" IEEE Transactions on Power Electronics, Volume: 21, Issue: 6, Pages 1735-1744, 2006 also employs an LCC converter. This arrangement reduces the need for a high voltage electrolytic by placing this on the secondary side of the transformer. Such approaches make use of parallel resonance and can take advantage of the extra control flexibility associated with a full-bridge of switched active devices.

The present application seeks to provide an alternative to the prior art discussed.

SUMMARY

The present application provides a power supply architecture which employs an isolated resonant stage, typically an LLC implementation, as the front-end in an AC-DC converter.

The use of an isolated resonant stage as the front-end in an AC-DC converter is in contrast to other arrangements known in the art where the isolated resonant stage is provided as a DC-DC converter after an initial stage, for example a boost stage PFC, at the front-end. In the present application, the isolated resonant stage circuit is operating on the mains AC waveform or the rectified AC waveform rather than on a DC or a pseudo DC voltage (a rectified AC which has been smoothed by a holding capacitor/smoothing capacitor).

The application also provides a "dual band" approach where there are two regions of desirable operation (corresponding to zero-voltage switching, low device stress etc) and each of these regions corresponds to different gain levels. It will be appreciated that the dual band approach is not restricted to just two regions (bands) of operation and that several regions may in practise be employed. Thus, it will be appreciated that the "dual band" approach is merely an example of a specific instance of a resonant converter type having a larger plurality of regions of quasi-fixed gain corresponding to desirable operation as described.

Whilst power factor correction is normally presented on the front end of any architecture, the relatively limited gain ranges available with optimised isolated resonant circuits are entirely unsuited to the range of gain values that would be required to take energy from the line voltage at levels consistent with obtaining quasi-unity power factor. The present application presents an unorthodox approach in which the power factor correction is implemented on the secondary side of the transformer, in complete contrast to conventional arrangements where it happens on the primary side of the transformer and indeed in most cases in an earlier stage altogether. The approach of the present application where power factor correction is required is to follow the isolated resonant stage with a boost converter located on the secondary side. This converter operates with a control law that is similar to that used in a conventional boost power factor correction stage. It will be appreciated that where a dual or multi-band approach is employed, the control law employed for the boost converter would need to be modified to accommodate for the more than one setting of the gain of the preceding isolated resonant stage.

It will further be recognised that the converter using the boost stage may require a current-limited control approach during start-up. Accordingly, the control function may adjust frequency or use PWM techniques to obtain a desired value of current—during start-up—to bring the voltage on the electrolytic capacitor up to the reflected peak line voltage, after which the boost stage can commence normal operation. A bypass diode may be provided so that the resonant isolation stage can directly feed the "bulk" capacitor on the secondary side under such start-up conditions.

The present application may address, if required, the gain-range limitation problem as referenced above in as the dual band approach by providing a dual range resonant isolation stage. More specifically, if the resonant isolation stage is uses the LLC approach, then a second LLC resonant circuit is provided, where this is selected to have a different frequency operating range to the first LLC resonant circuit. An alternative candidate for the role of dual/multi-range resonant isolation stage can involve usage of a multilevel converter with discrete modulation patterns each associated with a particular gain value. The term "resonant" may be understood to refer to a converter where the current is nominally sinusoidal—such as in LLC approaches—or where resonant transitions are used to achieve the low switching losses demanded.

Accordingly, a first aspect of the present application provides a switching converter in accordance generally with claim 1. Advantageous embodiments are set forth in the dependent claims.

The present application should also be taken to extend to and include the following numbered statements:

1. A switching converter for converting an input AC voltage to an output DC voltage, comprising: a primary side the primary side comprising: first and second AC input nodes for receiving an input AC voltage or a rectified form of the AC input voltage: a first switch having a first end connected to the first AC input node and a second end connected to a common switching node;
a second switch having a first end connected to the common switching node and a second end connected to the second AC input node;
a first LLC resonant circuit comprising the primary winding of a first transformer, wherein the first resonant LLC circuit is provided between the common switching node and the second AC input node; and
a secondary side comprising a secondary winding of the first transformer.
2. A switching converter according to statement 1, wherein the secondary side comprises a rectifier arrangement side for rectifying the voltage from the secondary winding.
3. A switching converter according to statement 2, further comprising a DC-DC switching circuit accepting the rectified voltage from the secondary winding and providing a DC output.
4. A switching converter according to statement 3, wherein the DC-DC switching circuit comprises a first boost converter.
5. A switching converter according to statement 3 or statement 4, wherein the DC-DC switching circuit comprises a buck converter.
6. A switching converter according to any preceding statement, further comprising a hold-up circuit for holding up the output voltage, wherein the hold-up circuit comprises a capacitor providing a hold-up voltage to a hold up switching circuit which in turn provides energy to the switching converter.
7. A switching converter according to statement 6, wherein the hold-up circuit is provided on a secondary side.
8. A switching converter according to statement 6, wherein the hold-up circuit is provided on the primary side.
9. A switching converter according to any preceding statement, wherein there are a plurality of secondary sides, each comprising a secondary side winding.
10. A switching converter according to any preceding statement, wherein the first series parallel resonant circuit is provided between a first node and a second node and the second series parallel circuit is also provided between the first and second nodes, where the first node is a switched node in the switching arrangement.
11. A switching converter according to any preceding statement, wherein the first pair of resonant frequencies comprise the series resonant frequency and the parallel resonant frequency of the first series parallel circuit.
12. A switching converter according to statement 11, wherein the first series resonant frequency is greater than the first parallel resonant frequency.

13. A switching converter according to any preceding statement, wherein the second pair of resonant frequencies comprise the series resonant frequency and the parallel resonant frequency of the second series parallel circuit.

14. A switching converter according to statement 13, wherein the second series resonant frequency is greater than the second parallel resonant frequency.

15. A switching converter according to statement 14, wherein the first parallel resonant frequency is greater than the second series resonant frequency.

16. A switching converter according to any preceding statement wherein the second primary winding is a tapped output from the first primary winding.

17. A switching converter according to any preceding statement, wherein the turns ratio between the first primary winding and the second primary winding is in the range of 4:1 to 3:2.

18. A switching converter according to any preceding statement, further comprising a controller for operating the switching arrangement.

19. A switching converter according to statement 18, wherein the controller is configured to operate the switching arrangement using a variable frequency.

20. A switching converter according to statement 19, wherein the controller has a first mode of operation in which the switching frequency is confined to a first frequency range and a second mode of operation in which the switching frequency is confined to a second frequency range.

21. A switching converter according to statement 20, wherein the first resonant frequency pair define the extent of the first frequency range.

22. A switching converter according to statement 20 or statement 22, wherein the second resonant frequency pair define the extent of second frequency range.

23. A switching converter according to any one of statements 20 to 22, wherein ratio between the centre frequency of the first frequency range and the centre frequency of the second frequency range is between 2 and 8.

24. A switching converter according to statement 23, wherein ratio between the centre frequency of the first frequency range and the centre frequency of the second frequency range is between 3.5 and 4.5.

25. A switching converter according to any one of statements 19 to 24, wherein the controller has a start-up mode of operation.

26. A switching converter according to statement 25 in which the start-up mode of operation is within a frequency range which is higher than the first frequency range and the second frequency range.

27. A switching converter according to any preceding statement, further comprising a transient detector for detecting a transient on the input AC voltage and in response thereto ensuring that the first and second switches are switched off.

DESCRIPTION OF DRAWINGS

The application will now be described with reference to the accompanying drawings and in which:

FIG. 11 illustrates a balanced capacitor implementation of FIG. 7.

DETAILED DESCRIPTION

Figure 1:
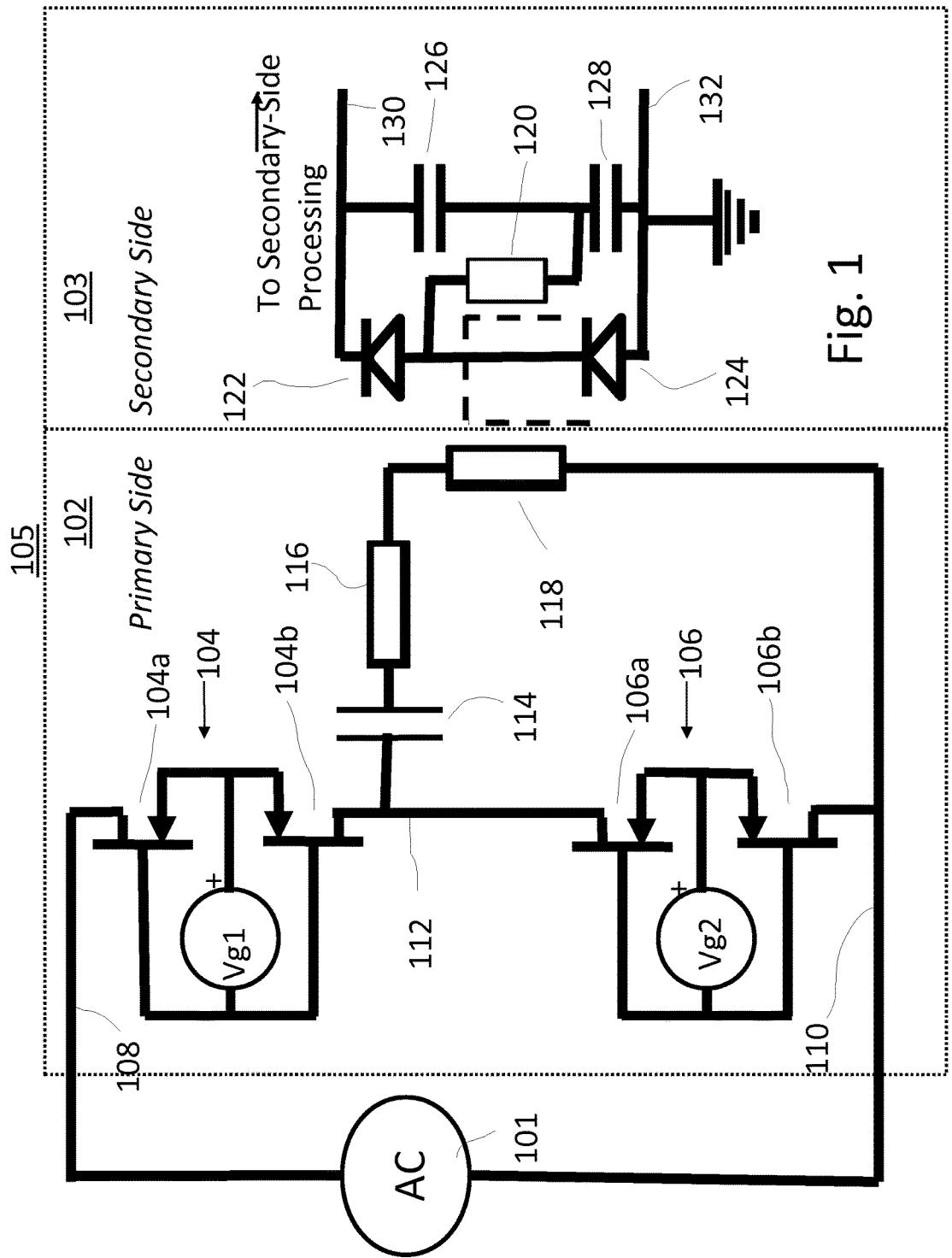
FIG. 1 is a front ended LLC AC-DC converter according to a first aspect of the present application.

The present application provides an AC-DC converter architecture with a front-ended resonant isolated stage, a role which may for example be performed by an LLC converter. It will also be appreciated that other resonant isolated stages may be used in place of the LLC converter. By front ended is meant that the LLC converter directly switches the incoming AC mains. There may of course be EMI filters, surge protection or similar circuits between the AC mains and the LLC converter input. However, in essence the LLC converter is fed directly from the AC supply. In some variations a rectifier bridge may be employed however to reduce the requirement for bidirectional switches. However, this may be less desirable from a losses perspective. However, it will be appreciated that in effect the LLC converter is operating directly on an AC mains waveform. There is no switching converter, e.g. such as a boost converter between the AC mains and the LLC converter. Similarly, there is rectifier circuit in combination with a capacitor smoothing out a rectified AC mains voltage to provide a pseudo DC voltage to the LLC converter. The use of a resonant converter at the front end of an AC-DC converter is entirely counter-intuitive since resonant or resonant-transition circuits operate most effectively when transformation ratios are nominally fixed or have a small number of effectively discrete values. This is one reason why they are conventionally used to convert a pseudo DC voltage. However, the inventor of the present application has realised that whilst other architectures may make sense in the range of conventional switching frequencies that when higher switching frequencies are employed, the advantages of resonant converters become more attractive and the architecture is more suited to high-voltage high frequency power conversion, where the resonant circuits facilitate zero-voltage switching on turn-on and typically reduced or nominally-zero values of current on turn-off Implementing current shaping as required for power factor correction functionality typically involves usage of a boost stage. Obtaining soft-switching operation of a boost stage at high voltage and high frequency presents a considerable challenge. The design task for a boost converter is eased considerably it can be operated at low-voltages, of the order of those typically used at the secondary side of power converters.

The architecture as proposed thus involves usage of a high-voltage high-frequency resonant isolated converter having quasi-fixed ratio followed by a boost converter operating at low voltage to perform the current shaping functionality. It will be recognised that efficiency of the boost converter will be enhanced if the preceding isolated converter can operate at more than one quasi-fixed ratio.

It is of course recognised that the component utilisation of the resonant isolated converter will be relatively low as compared with its usage for DC power conversion. This can however be acceptable as improved switches are becoming available. This cascade of initially an isolated resonant stage feeding a secondary-side boost current-shaping stage can rival the power density and efficiency associated with the more conventional deployment where the boost current shaping stage is followed by a resonant isolation stage.

The operation of the converter will now be described, with reference to the exemplary converter 105 in FIG. 1, in which the AC voltage 101 is shown arriving between a first input node 108 and a second input node 110. For ease of explanation, features such as EMI filtering and surge protection have been omitted. An LLC switching converter 105 is connected between the first and second input nodes. The switching converter is an isolated converter with a primary (mains) side 102 and a galvanically isolated secondary side 103 having a DC output between two nodes 130, 132. The secondary output is generally a low voltage (less than 60 Volts). However it may be a higher voltage for particular requirements.

A first switch 104 is provided having a first end connected to the first AC input node 108. The second end of the switch is connected to a common switching node 112. A second switch 106 has its first end connected to the common switching node and its second end connected to the second AC input node 110. Each of the switches are controlled by control signals $V_{g1}$, $V_{g2}$. The two switches are controlled to ensure that when one switch is on the other switch is off. The first and second switches are bi-directional switches allowing the flow of current in both directions.

In one implementation, each switch 104, 106 comprises a series combination of two MOSFET's connected in series with their sources connected in common in a totem configuration.

A first LLC resonant circuit is provided to provide the resonant elements of the LLC converter. The LLC resonant circuit suitably comprises a capacitor 114 in series with two inductors 116, 118. The LLC resonant circuit is connected at one end to the common switching node 112. The LLC is connected at the opposite end to the second AC node 110.

The LLC circuit comprises the primary winding 118 of a transformer acting as a first inductor in the LLC circuit. There may be a separate discrete inductor 116 provided in series with the primary winding acting as the second inductor in the LLC circuit. Alternatively or in addition to a discrete inductor, the second inductor 116 may be provided by leakage inductance within the transformer. The capacitor 114 is suitably a stable type that can carry the relevant current and which is able to withstand voltages associated with transient loading effects, and may be a film type or a C0G/NP0 ceramic type.

The secondary side 103 provides a DC output between two output nodes 130 and 132. Subsequent circuits (discussed below) are employed to further process this DC output. The secondary side 103 comprises a secondary winding 120 of the transformer. The secondary winding is connected to a rectifying circuit to provide a DC output to nodes 130,132. In the exemplary circuit shown, the rectifying circuit comprises two series connected diodes 122, 124 and two series connected capacitors 126, 128.

One side of the secondary winding is connected between the common node of the two series connected rectifiers. The rectifiers may be diodes as shown. Alternatively, they may be synchronous rectifiers. In the latter case, the synchronous rectifiers may be controlled using pulse transformers from a primary side controller. It will be appreciated that this ensures that the timing for primary side switches and the rectifier are the secondary are synchronised. The opposite side of the secondary winding is connected between two series connected capacitors. The respective ends of the series capacitors and diodes connected together providing a DC output between the ends. It will be appreciated that other secondary side configurations are possible. The output 130, 132 from the rectifying section is provided to a first DC-DC converter which provides a regulated DC output. In certain arrangements, there may be a bulk capacitor at the input of the first DC-DC converter. More particularly, where a single DC-DC converter stage (for example a buck converter) is employed a bulk capacitor may be provided at the output of the rectifying section. Where there is more than one DC-DC stage, the bulk capacitor may be placed between a first DC-DC converter (which may be a boost converter) and a second DC-DC converter (which may be a buck converter).

Whilst the use of an LLC is entirely counter-intuitive because of inherent unsuitability due to the limited operating range associated with the low Q factor which is desirable for efficiency, the advantages offered include voltage surge immunity, suitability for higher frequency operation (meaning smaller magnetics) and a reduced requirement for EMI filtering. Specifically, if the transformer "quiet" end is brought to the midpoint of a capacitive divider across the input (discussed in greater detail below), then the fundamental frequency of the ripple current is at twice the switching frequency.

With respect to surge immunity, the incoming AC voltage is shared across the two switches. If one switch is ON, the AC voltage and any resultant surge will be presented solely across the other switch. However, if both switches are off, the surge is shared between the two devices. This means that lower voltage switches may be used. Accordingly, the circuit provides for a controller for operating the two switches with active surge protection. The active surge protection comprises a circuit measuring the input AC voltage. This circuit may for example comprise using a simple resistor divider to measure the AC voltage with the output from the divider provided to one input of an absolute value comparator. The other input may be a reference voltage indicating an upper operating voltage of the switching converter. Upon reaching this level, the output from the comparator may be used to cause the controller to ensure that both switches are switched off. It is also possible to employ a dv/dt circuit for detecting a sudden change on the input voltage and ensuring an immediate switch off of both switches in the event of detecting such a change.

However, in order to ensure low voltage stresses, that the Q factor of the LLC circuit should be sufficiently low, less than 5, and more typically in the range of 0.5 to 3. The design process establishes initially the transformer turns ratio such that the gain at the series-resonant frequency is approximately equal to the transformer turns ratio, as adjusted for the half-bridge or full-bridge nature of input switching and output rectifier configurations, is compatible with the voltage transformation ratio needed and is associated with an operating frequency range that is compatible with the component types available. The product of the resonant capacitor and the series inductor will thus be a consequence of selection of the series resonant frequency. The other key parameters are the ratio of series inductance to series capacitance, and the ratio of series inductance to parallel inductance. These parameters will determine the extent of gain "boosting" that is possible, as well as aspects such as circulating current and frequency range needed for regulation, with a compromise selection process being involved here.

A further advantage of the converter is that in contrast to converters using a rectifier and bulk capacitor there is no significant inrush current to address at start-up. The configuration also provides for zero-voltage switching which in turn is conducive to operation at higher switching frequencies. Operating at higher switching frequencies in turn allows for a reduction in the size of the input filter. In this context, the LLC converters described in this application are suitable for use at high frequency where the converters switching frequency (which may be variable) is at least 100 kHz.

It will be appreciated that in lower power requirements (power supplies with an input power of less than 75 W for general deployment and at lower levels in the case of lighting applications) that PFC requirements defined in legislation may be reasonably lax. Accordingly, for such lower power converters, formal PF considerations may be generally ignored.

In such converters, the converter may be operated by connecting the bulk electrolytic capacitor directly to the output of the rectifier section. The control strategy is then concerned with selecting a profile of current that is likely to give maximum efficiency in the relevant part of the line cycle—the "conduction angle" that is compatible with the chosen gain band(s). Once this is selected frequency control may be employed to achieve this. This may mean operation above or below the series resonant frequency and with synchronous rectifiers controlled to emulate the operation of the secondary side diodes. The value of current may be calculated using the value of the bulk secondary-side electrolytic voltage at the onset of the preferred voltage range associated with efficient conversion, and the desired current value is chosen such that the voltage on the electrolytic capacitor is brought to the desired level just prior to the converter dropping out of its preferred operating region on the trailing edge of the line half-cycle. Given the dual-band approach, this may correspond to a plurality of periods within the line cycle corresponding to desirable operation conditions, and the current associated with each of these intervals can be determined a priori by the controller. Current control may be effected by varying the frequency of operation in the relevant frequency band or bands to obtain the requisite current value.

Figure 2:
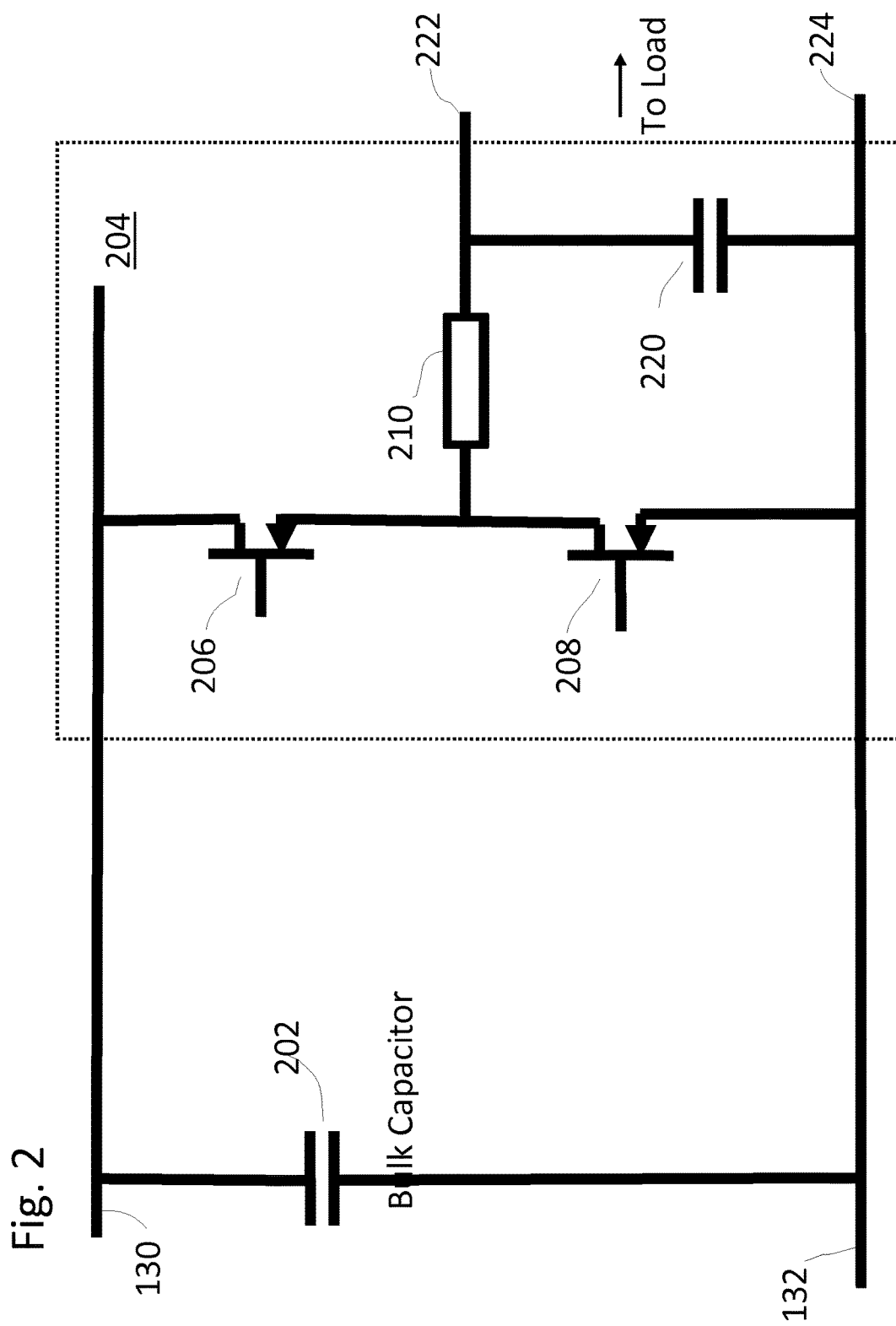
FIG. 2 is an exemplary secondary side circuit for use with the converter of FIG. 1.

In such a configuration, a DC-DC converter may be provided on the output 130, 132 to provide a regulated DC output voltage $V_{out}$ between two output nodes 222, 224. This DC-DC converter 204 may be a simple buck converter provided after the rectifying circuit on the secondary side to provide for a regulated DC voltage output from a secondary side bulk capacitor 202 provided at the output 130, 132 of the rectifier circuit previously described and such an arrangement is shown in FIG. 2. The buck converter comprises two series connected switches 206, 208. The first switch is connected to a first end of the bulk capacitor with the second switch connected to the opposite end of the capacitor, with one end of an inductor 210 connected to the common node between the two switches. The opposite end of the inductor is connected to one side of an output capacitor 220 which is connected to the node common between the second switch and the bulk capacitor. The output voltage is taken across the ends 222, 224 of the output capacitor.

Achieving high-density, low-loss energy storage is a desirable to the goal of implementing converters with the small size and high efficiency. With the present converter, the principal energy storage element (capacitor) is now on the secondary side, typically operating at low voltage comparable with the typical range of output levels. This compares favourably with common usage of high-voltage electrolytic capacitors rated at nominally 400V-450V on the primary side.

Whilst the above described implementations obviate the requirement for a high voltage electrolytic capacitor as a bulk capacitor on an input rectifying stage, it is still necessary to provide for a bulk capacitor on the output. The bulk capacitor is required firstly to store sufficient charge for energy storage when the mains AC falls below the minimum operating voltage around the zero crossing points in the mains cycle and secondly for hold-up. The requirement for hold-up is generally 20 ms in the event of line power loss. The recognition is that the energy storage required for holdup is typically 4 times the energy storage need associated with zero-crossing management (of the AC mains), and the holdup aspect occurs very infrequently whereas the zero-crossing management aspect occurs every cycle or half cycle. Conventionally, hold-up is typically the dominant factor in selecting the value of the bulk capacitor. The hold-up requirement means that the capacitor must be sized to be larger than required for its general function.

Recognising this aspect, it can be useful to allocate high-quality capacitance (low equivalent series resistance) to address the cycle-by-cycle energy exchange, whilst the holdup management can be addressed by capacitance with higher proportional equivalent series resistance. An example here of capacitance with higher series resistance, and suitable for "occasional" usage, is the currently available range of electric double-layer capacitor ("EDLC") devices, colloquially termed "supercapacitors". These typically have energy density in terms of mass or volume of 10× times that of the 400V-450V-rated capacitors as typically used for the bulk input capacitance function in AC-DC converters. For similar performance in a holdup context, the revised architecture can be equipped with a high-quality capacitor having smaller energy storage located on the secondary side for cycle by cycle storage. This may then be supplemented with a supercapacitor cell or bank of cells that is charged within the allowed starting time of the converter and which is available to provide energy for the requisite holdup time, with this energy insertion being either on the primary or on the secondary.

Accordingly, in one aspect, the present application presents low-voltage energy storage using two different classes of capacitance. Electrolytic capacitors typically have adequate equivalent series resistance ("ESR") characteristics and energy density and may be used to manage the ripple currents as needed. Typically, holdup requirements for ACDC power converters are of the order of one line cycle, or 17 ms to 20 ms under worst case conditions. The energy required to provide this holdup functionality is typically four times the energy as needed for ripple current management. This "reserve" capacitance as required for transient management and for holdup functionality is needed of course much less frequently and capacitors with higher equivalent series resistance—and thus higher losses—can be deployed in this role.

It will be appreciated that converters of this type become practical when the aggregate size of energy storage capacitors on the secondary side become comparable with the aggregate size of an electrolytic capacitor as used on the primary side. This is possible if electrolytic capacitors are used for the ripple current management role, with the holdup functionality being addressed using electric double-layer capacitors ("EDLC") otherwise known as supercapacitors.

The capacitance selection process is best illustrated by consideration of a numerical example, involving some approximations which will be evident to those versed in the art, but which has validity in indicating the design task involved. A 200 W supply with holdup will typically require a ripple storage energy of the order of 1 J and an additional energy storage aspect solely associated with transient/holdup functionality of 4 J. in the case of the primary-side energy storage this energy all needs to be available from the electrolytic capacitor. With a setpoint of 400V and dropout level of 300V, the nominal capacitance value associated with this level of energy storage is 143 uF. Given tolerance issues and the like, a 180 uF part may be chosen. A representative part is the Rubycon 420MXK180MEFCSN25X25, rated for 105 C operation, 420V and with a volume approximating a 25 mm cube.

If we are then to look at the task of provision of a comparable amount of energy on the secondary side, one may consider usage of a 35V-rated capacitor, discharged to perhaps 12V, and here a 2200 uF type can have energy storage of 1 J. A representative type here is Panasonic EEU-FR1V222 of size 16 mm diameter and comparable height of nominally 25 mm.

The requirement is then to provide an additional 4J of energy that can involve capacitance of lower grade, e.g. using EDLC technologies. The Murata DMF4B5R5G105M3DTA0 is an example of the current state of the art, with 1F nominal value with 4.2V operating voltage and an ESR figure of 40 mR in an overall volume of 30 mm×14 mm×3.7 mm. The nominal energy storage of such a device on a 0.5 $CV^2$ basis is 8.82 J. The power than can be extracted during a 20 ms holdup interval is not fully quantifiable based on published data, but given ESR data the maximum power available is 110 W, indicating that two or perhaps three such devices would be needed to meet holdup requirements.

This indicates that the aggregate physical volume of low-voltage capacitance as used in this revised approach can approximate the aggregate volume of high-voltage capacitance as used in a conventional approach, but there is a management task associated with the heterogeneous types of capacitance used and their different operating voltage levels and discharge characteristics. Simply connecting capacitance of different types in parallel does not suffice and hence the approaches which will now be discussed.

Figure 3:
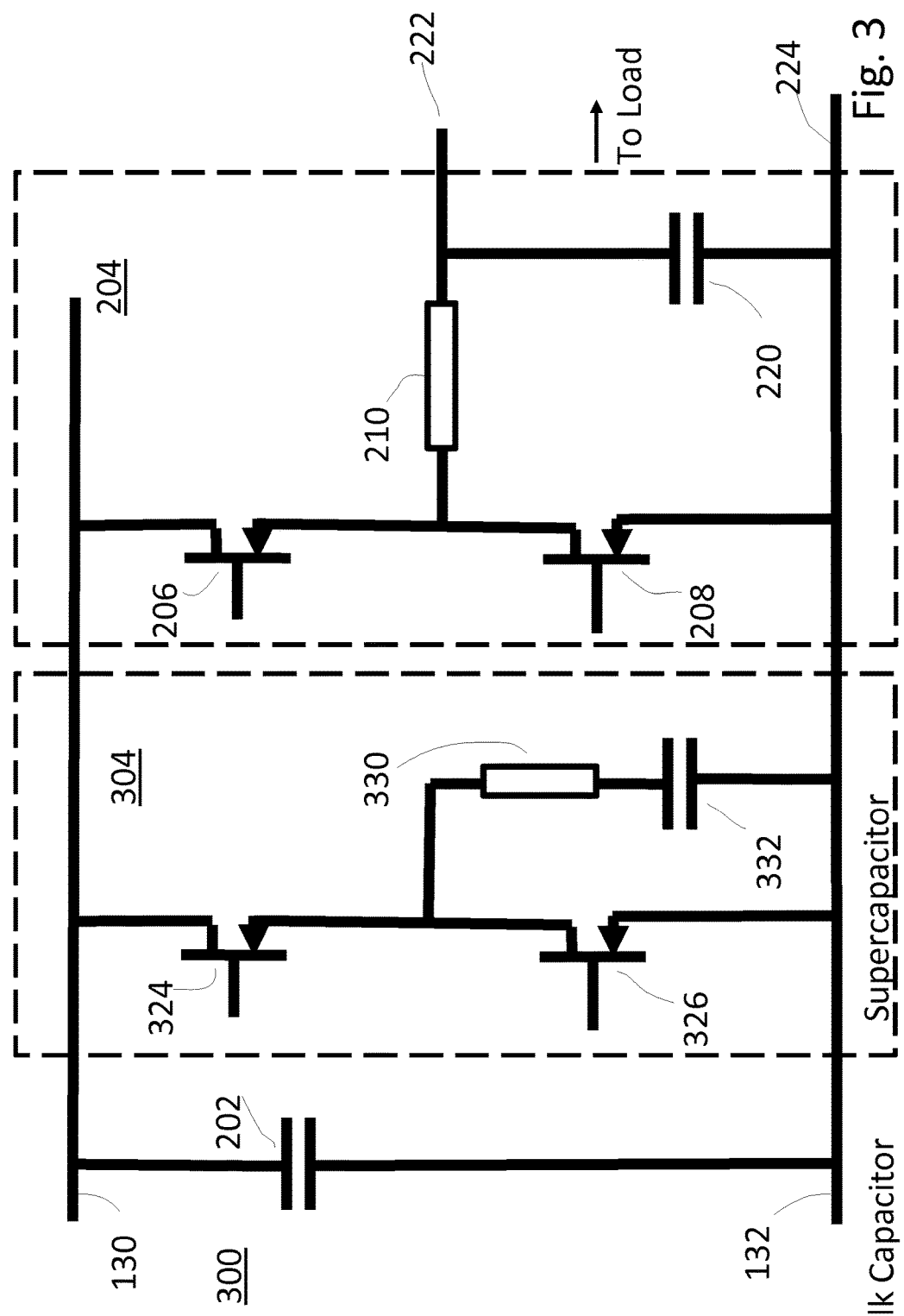
FIG. 3 is a further exemplary secondary side circuit for use with the converter of FIG. 1.

It will be appreciated that the separation of these functions may be used in other AC-DC converters and is not restricted to the arrangement described above. However, this will now be explained with reference to the arrangement 300 of FIG. 3, in which the two functions for the capacitor are separated using two separate capacitors. The arrangement 300 of FIG. 3 is as shown in FIG. 2 with the placement of a hold-up circuit 304 between the bulk capacitor 202 and the buck converter 204 previously described with respect to FIG. 2. The hold-up circuit comprises a capacitor 332 which provides the hold-up energy storage. This means that the size of bulk capacitor 202 can be reduced by sizing it just to provide smoothing when the main voltage approaches zero in the mains cycle. At the same time, the capacitor 332 providing the hold-up energy storage may be a high energy storage density capacitor such as an EDLC capacitor. These types of capacitors are not generally suitable for use in a switching power supply because of their reasonably high ESR compared to electrolytics which would result in excessive losses. However, as the capacitor is only used as required for hold-up, a higher ESR has no effect on the efficiency of the converter. Thus by splitting the functions of smoothing and hold-up, the best capacitor characteristics may be selected for each. The hold-up circuit is suitably connected in parallel with the bulk capacitor. Switches 324 and 326 are suitably employed as a buck converter using inductor 330 to charge the hold-up capacitor on start-up. The buck converter may be operated until the capacitor has reached its designed voltage, whereupon the buck converter is switched off. For discharge, the hold-up circuit is suitably arranged as a boost stage converter with the bulk capacitor 202 acting as the output capacitor of the stage and the hold-up capacitor 332 providing the input to the boost stage. More particularly, the first switch 324 is connected to a node common with a second switch. A series inductor 330 capacitor 332 combination is provided in parallel with this second switch, with the hold-up capacitor being the capacitor of the series inductor-capacitor combination. It will be appreciated that the hold-up functionality may be provided from a separate circuit. For example a separate secondary winding may be employed to charge the hold-up capacitor which in turn may provide hold-up voltage to any suitable part of the converter. A controller (not shown) may use a suitable detection circuit to determine when the power from the mains has dropped significantly or more likely is gone altogether. Upon making such a determination, the controller may send suitable switching signals to switches 324, 326 to operate the hold-up circuit and to cause energy stored in the hold-up capacitor to be switched to bulk capacitor 202.

Figure 4:
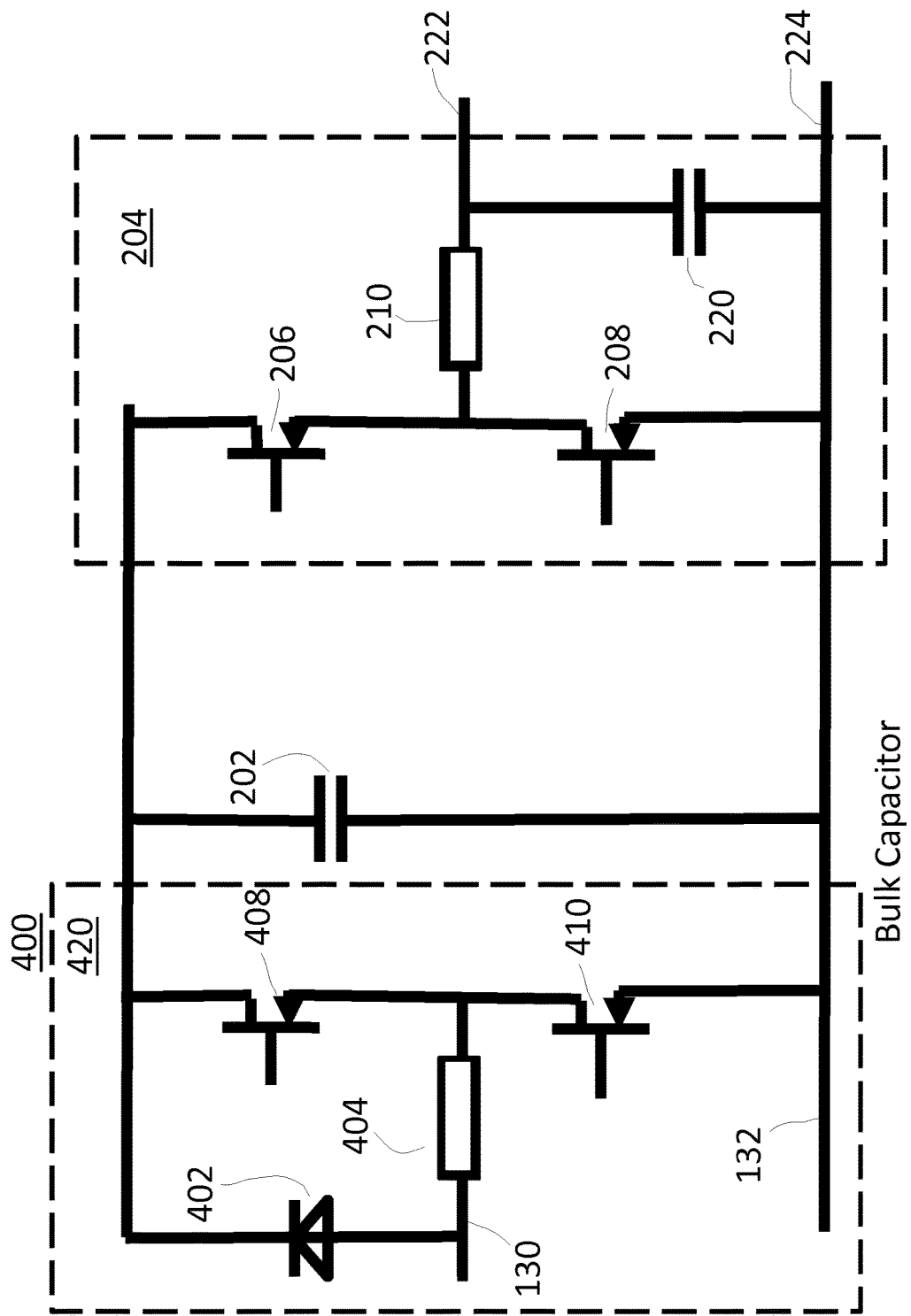
FIG. 4 is yet another exemplary secondary side circuit for use with the converter of FIG. 1.

The arrangement involving direct feed from the secondary side rectifier 103 to the electrolytic bulk capacitor 202 are suitable for lower power outputs where PFC requirements are generally less strict. However, for higher power outputs, it is necessary to ensure that the AC-DC converter meets PF requirements. A further configuration 400, as shown in FIG. 4, allows for fully-compliant PF performance by operating the LLC converter stage as a transformer having a fixed transformation ratio (a further arrangement discussed below provides for more than one ratio). A DC-DC converter (for example a boost stage) 420 on the secondary side is placed between the previously described rectifier circuit 103 and bulk capacitor 202. This boost stage converter provides PFC for the AC-DC converter. It will be appreciated that a suitable controller may be provided to implement a control law to provide PFC. An exemplary control law in the case of a single-ratio preceding stage involves determination of an equivalent emulated resistance with a fast "inner" current control loop such that the input current follows the input voltage, thus giving high power factor. The emulated resistance is slowly-varying and controlled by an "outer" loop that obtains overall power balance consistent with maintaining the average voltage on bulk capacitance close to a nominal value.

In a situation, when the preceding resonant isolation stage has a plurality of nominal gain values, the current as demanded by the boost stage may be adjusted to reflect the gain value deployed at any particular time, such that the current drawn from the line will approximate a sinusoid.

The boost converter which will be familiar to those skilled in the art comprises an inductor 404 which is connected to one of the outputs 130 from the rectifier circuit 103 is connected at the other end to the common node between two switches 408, 410. The first of these switches 408 provides an output to the bulk capacitor 202. The second switch is connected to the second output 132 of the rectifier circuit 103. A controller (not shown) is employed to operate switches 408, 410. A diode 402 is employed to by-pass the boost stage. This is for example in the case of start-up, where a feed from the rectifier to the bulk capacitor via diode 402 reduces stresses in the boost converter, avoiding having initial current flow through elements 404 and 408. Once the boost stage is operating the diode is no longer required.

Figure 8:
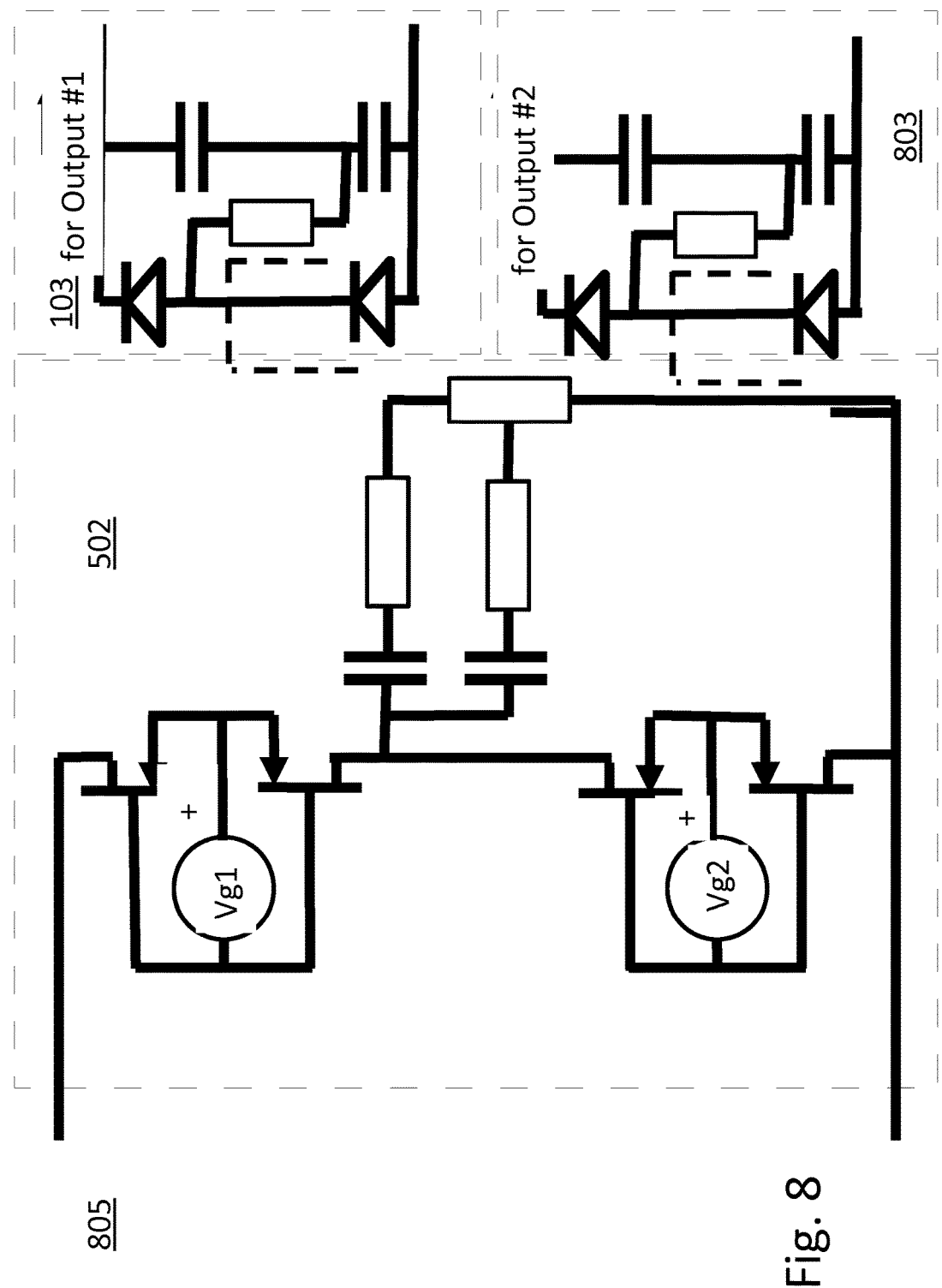
FIG. 8 is the arrangement of FIG. 5 with more than one secondary side circuit.

It will further be recognised that operating the converter in the mode where it effectively functions as a transformer with one or more fixed ratios that are largely independent of loading allows the primary stage to provide power to a number of galvanically-isolated secondary stages using additional windings on the transformer. An exemplary arrangement having additional secondary windings is shown in FIG. 8 with a dual LLC circuit which will be described below in the context of FIG. 5.

The transformation ratio corresponds to a particular frequency in the relevant band corresponding to quasi-optimal conditions in terms of device utilisation and thus efficiency. The frequency also corresponds to a condition where the gain of the stage is largely independent of load. PFC operation is then obtained by loading the fixed-ratio converter by a boost converter on the secondary side as just described.

A further advantage of the architecture with low-Q is that the gain slope close to the series-resonant frequency is relatively flat. This allows for intentional small frequency variation—"frequency smearing"- to be introduced without materially affecting the gain or other key operating parameters of the converter.

The control law of this boost converter may be selected so as to be comparable to that of a primary-side conventional boost converter in drawing a current from the line proportional to the line voltage, with naturally alterations in the current demand corresponding to effective transformation ratio changes in the LLC converter stage. In this way, the boost stage on the secondary acts as the PFC circuit for the LLC converter with the net result that excellent PF performance may be obtained. More particularly, the current in from the secondary stage boost converter may be controlled to generally follow the input voltage. The boost stage 420 is located between the secondary side rectifying elements previously described and the bulk capacitor. As before a buck converter is provided after the bulk capacitor to provide a regulated DC voltage.

It will be appreciated that the hold-up circuit described above may be employed with the boost stage and for example may be provided between the boost stage and the output buck stage.

As noted, more than one gain-band is contemplated, with advantages as cited. This is achieved using approaches which will be described below. These will be described with reference to using two gain-bands which is practical. However, it will be appreciated that yet further gain-bands may be included at the cost of additional components and complexity.

Figure 5:
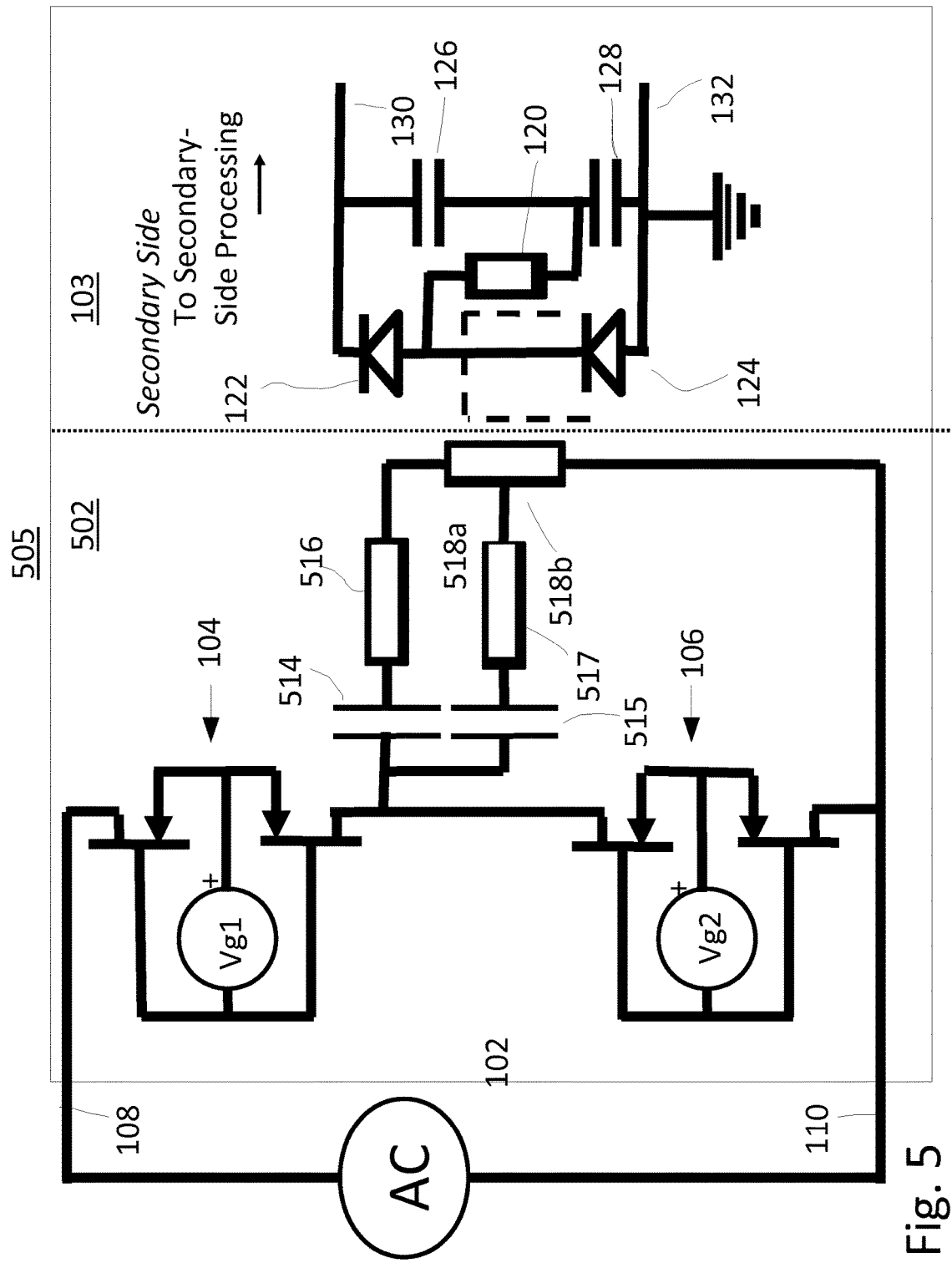
FIG. 5 is a front ended LLC AC-DC converter according to a second aspect of the present application.
Figure 6:
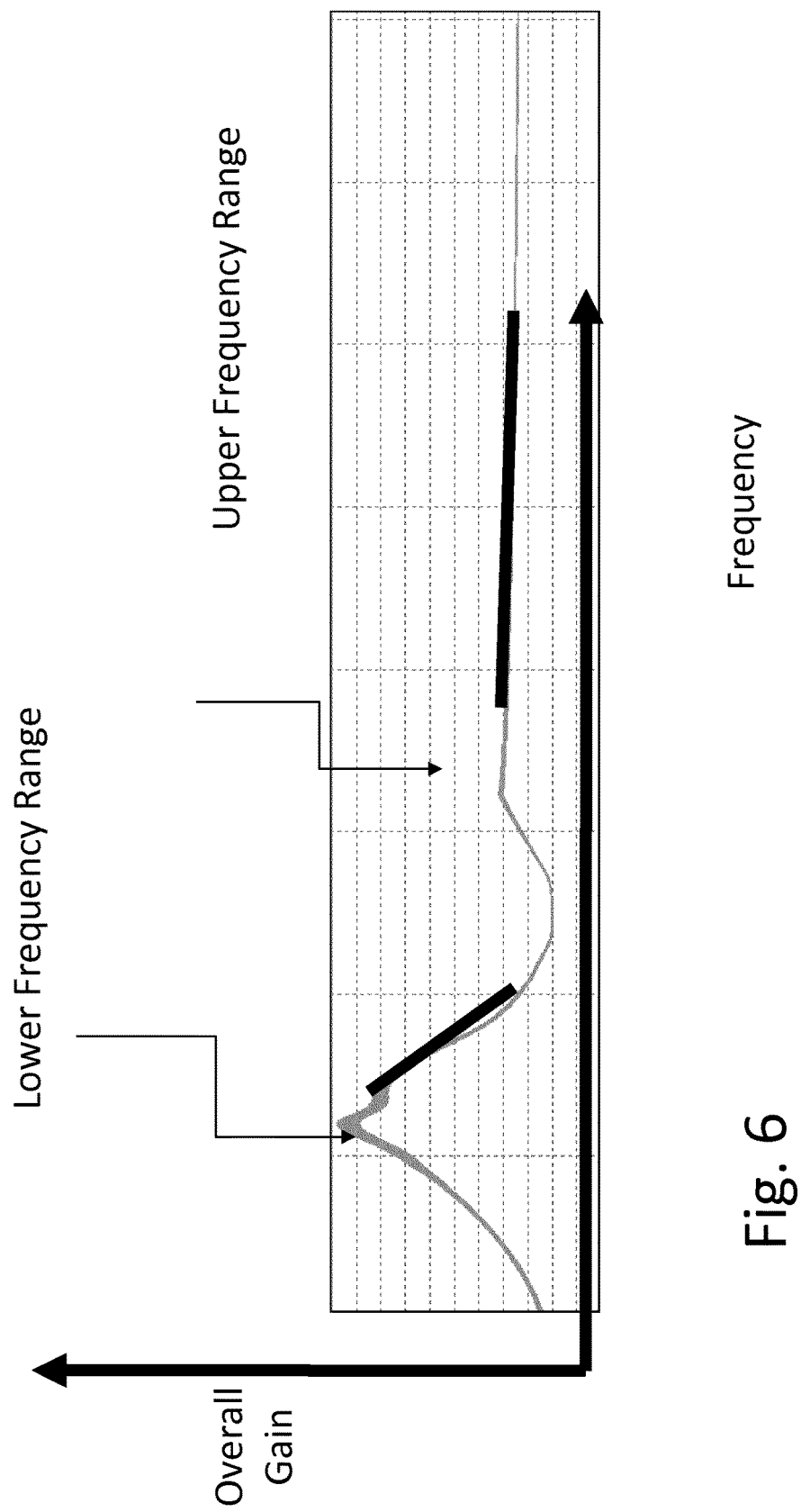
FIG. 6 is a plot showing an exemplary characteristic for converter gain with respect to frequency for a converter of the type generally shown in FIG. 5.

With reference to FIG. 5, and in contrast to FIG. 1, which uses a single series parallel resonant (LLC) circuit, two series parallel resonant (LLC) circuits are employed. The two LLC circuits are effectively arranged in parallel (albeit that they may share part of a winding). As a result, the same switching arrangement 104, 106 as previously described may be employed to switch the two LLC circuits. The secondary side 103 is as previously described with reference to FIGS. 1-4. The first series parallel resonant circuit as before in FIG. 1 comprises a primary winding 518a of a transformer 518, a series inductor 516 and a series capacitor 514. The first series parallel resonant circuit has a parallel resonant frequency $f_{p1}$ and a series resonant frequency $f_{s1}$ as shown in FIG. 6 and has an associated frequency range of operation which extends above the parallel resonant frequency $f_{p1}$ and generally contains the series resonant frequency $f_{s1}$.

As before a switching arrangement is provided for switching the input voltage to the first series parallel circuit. Thus in the exemplary switching arrangement the two primary side switches 104, 106 may be operated as a symmetric half-bridge with nominally 50:50 drive ratio. A small dead-time may be introduced to allow current to drive the drain voltage of the switch that is about to conduct to zero.

A second series parallel resonant circuit is provided comprising a capacitor 514 in series with an inductor 516 and a transformer winding 518b. This second series parallel resonant circuit may comprise a separate transformer with primary and secondary windings and a separate output circuit providing energy to the load. Advantageously however the second series parallel resonant circuit may share the transformer 518 with the first series parallel resonant circuit. This sharing may be by separate primary windings. Alternatively, the primary winding of the second series parallel resonant (LLC) circuit may comprise a tapped connection to the primary winding of the first series parallel resonant circuit. Whilst the turns ratio between the primary and the tapped primary will vary depending on the particular implementation, it is suitably somewhere in the range of 4:1 to 3:2.

At the same time the ratio between the primary and secondary will depend on the input and output voltage requirements.

Using the tapped transformer primary winding or an additional primary winding of lower turns count, the second series parallel resonant circuit is chosen to operate when voltage gain is required (i.e. when the AC line voltage is low). The tapping point is desirably such that 33% or 50% of the turns are between the tapping point and the "quiet" connection 110 to the transformer.

The second series parallel resonant circuit is designed such that it has a second pair of resonant frequencies comprising a parallel resonant frequency $f_{p2}$ and a series resonant frequency $f_{s2}$. These provide a second region of operation. The second region of operation suitably commences at a point above the parallel resonant frequency $f_{p2}$. The second region suitably includes the second series resonant frequency $f_{s2}$.

The second pair of resonant frequencies ($f_{p2}$, $f_{s2}$) are different to the first pair of resonant frequencies ($f_{p1}$, $f_{s1}$). It is generally intended that the second LLC circuit provide a second region 134 of operation having a different frequency range to the first. Indeed it is generally desirable that two ranges do not overlap but instead are separated. Thus, in the case where the range between the second pair of resonant frequencies ($f_{p2}$, $f_{s2}$) is higher than those of the first pair of resonant frequencies ($f_{p1}$, $f_{s1}$), the second parallel resonant frequency ($f_{p2}$) will be selected to be greater than the first series resonant frequency $f_{s1}$.

It will be appreciated that the first and second series resonant (LLC) circuits are both effectively provided between a first node and a second node, where the first node is the switched common node 112.

The range of operation is a function of the input voltage, with some measure of hysteresis. Suitably, the border between modes is selected to be between 160 and 200 Volts. An exemplary value of instantaneous input voltage corresponding to the boundary between modes is 180V.

Thus the controller may have two distinct modes of operation. In the first mode of operation the switching frequency is confined to a first frequency range 132. In the second mode of operation the switching frequency is confined to a second frequency range 134.

The first frequency range corresponds to the operating range of the first LLC circuit and is associated with the first pair of resonant frequencies ($f_{p1}$, $f_{s1}$). The second frequency range corresponds to the operating range of the second LLC circuit and is associated with the second pair of resonant frequencies ($f_{p2}$, $f_{s2}$). The ratio between the centre frequency of the first frequency range and the centre frequency of the second frequency range will be selected by the circuit designer and for example may be between 1.5 and 4.

As noted, the "mode shift" between the two regions of operation is effected most readily based on measurement of the input voltage, with appropriate usage of hysteresis to avoid mode-hopping near the mode boundary voltage.

Whilst the present application has been described in the context of an LLC converter having a half bridge configuration, it will be appreciated that a full bridge configuration may also be employed. A full bridge configuration would be less desirable due to the increased component count. Usage of a phase-shifted full-bridge stage can also involve greater complexity in managing common-mode EMI performance.

Figure 7:
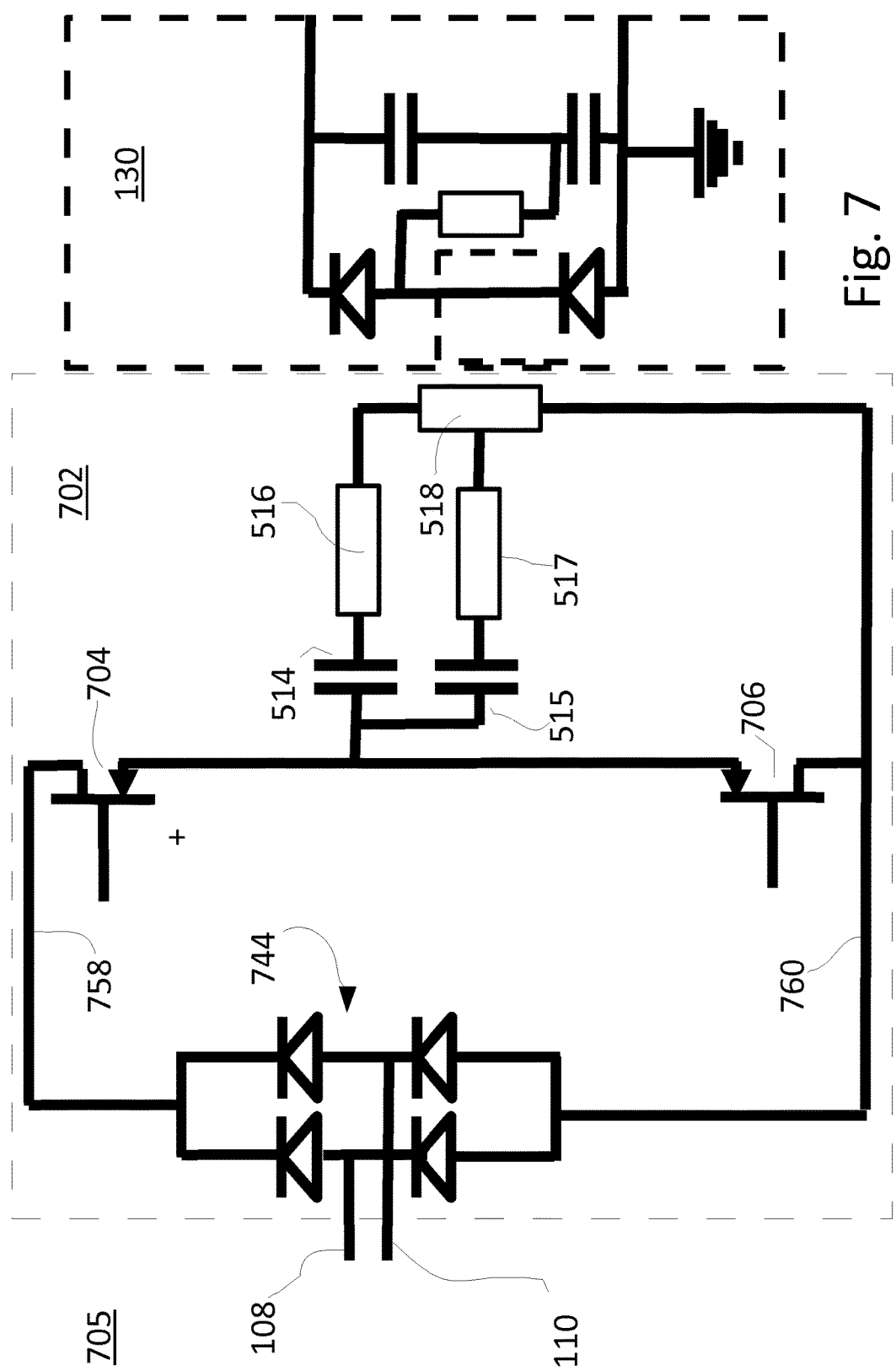
FIG. 7 is an alternative implementation of the converter of FIG. 5.
Figure 9:
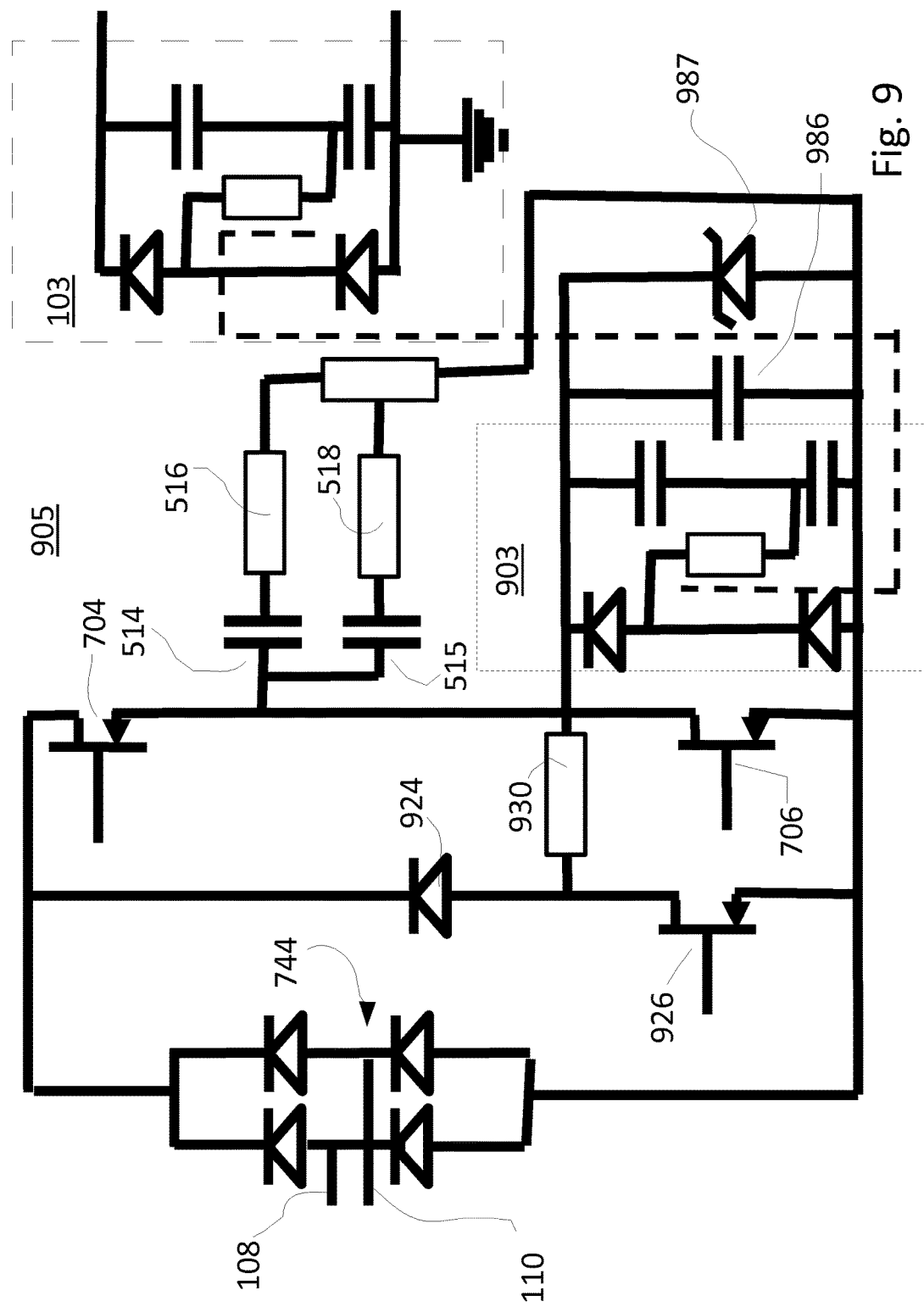
FIG. 9 corresponds to the implementation of FIG. 7 with the inclusion of a hold-up circuit on the primary side

Similarly, the present application has been described in the context of using bi-directional switches in the half bridge. It will however be appreciated that if a rectifier bridge 744 is placed before the half bridge, as shown in FIG. 7, that bi-directional switches are not required to switch the LLC resonant circuit or circuits. Thus in the arrangement 705 shown the secondary side rectifier stage 130 is as described previously. With the primary side 702, AC input 108, 110 is provided to the input of the rectifier bridge 744. The outputs of the rectifier bridge 758, 760 are provided as the input to the LLC stage in which the bidirectional switches are replaced with switches 704, 706. In the exemplary arrangement there are two LLC circuits, the first circuit comprising capacitor 514, inductor 516, primary of transformer 518 and the second circuit comprising capacitor 515, 518 and suitably a winding on the same transformer. Although in this case, the AC signal will be rectified AC. It will be appreciated that as there is no bulk capacitor, the signal provided to the input of the LLC circuit will correspond directly to the AC mains albeit rectified. Whilst the circuit will be less efficient because of the voltage drop on the rectifiers and the EMI performance may be worse, the components may be less expensive. It will be appreciated that when the boost stage previously described is used on the secondary side, that the arrangement still provides for power factor correction. A further advantage is that the hold-up function may be implemented simply on the primary side, which is useful where there are multiple secondary side windings and a common primary side winding. Such an arrangement is shown in FIG. 9. In this arrangement 905, a hold-up circuit is provided which includes a secondary stage 903 including a secondary winding and the diode capacitor combinations previously discussed in the context of secondary 103. The output from the rectifiers is used to charge a hold up capacitor 986. A zener diode 987 or similar voltage limiting feature is provided to limit the voltage across the capacitor 986. In the event of a drop in the mains AC voltage being detected by a controller (not shown), the controller may operate switch 926, which in combination with diode 924 and inductor 930 are configured to act as a boost stage providing an output to the input to the switches of the LLC circuits and thus allowing the LLC stage to continue operating not withstanding a AC main drop.

The advantage of this approach is that a single hold-up circuit may be used even though there may be multiple secondary output stages as shown in FIG. 8. It will be appreciated that whilst the hold-up function is on the primary side, the secondary sides still have bulk capacitors for storing charge across a cycle.

Figure 10:
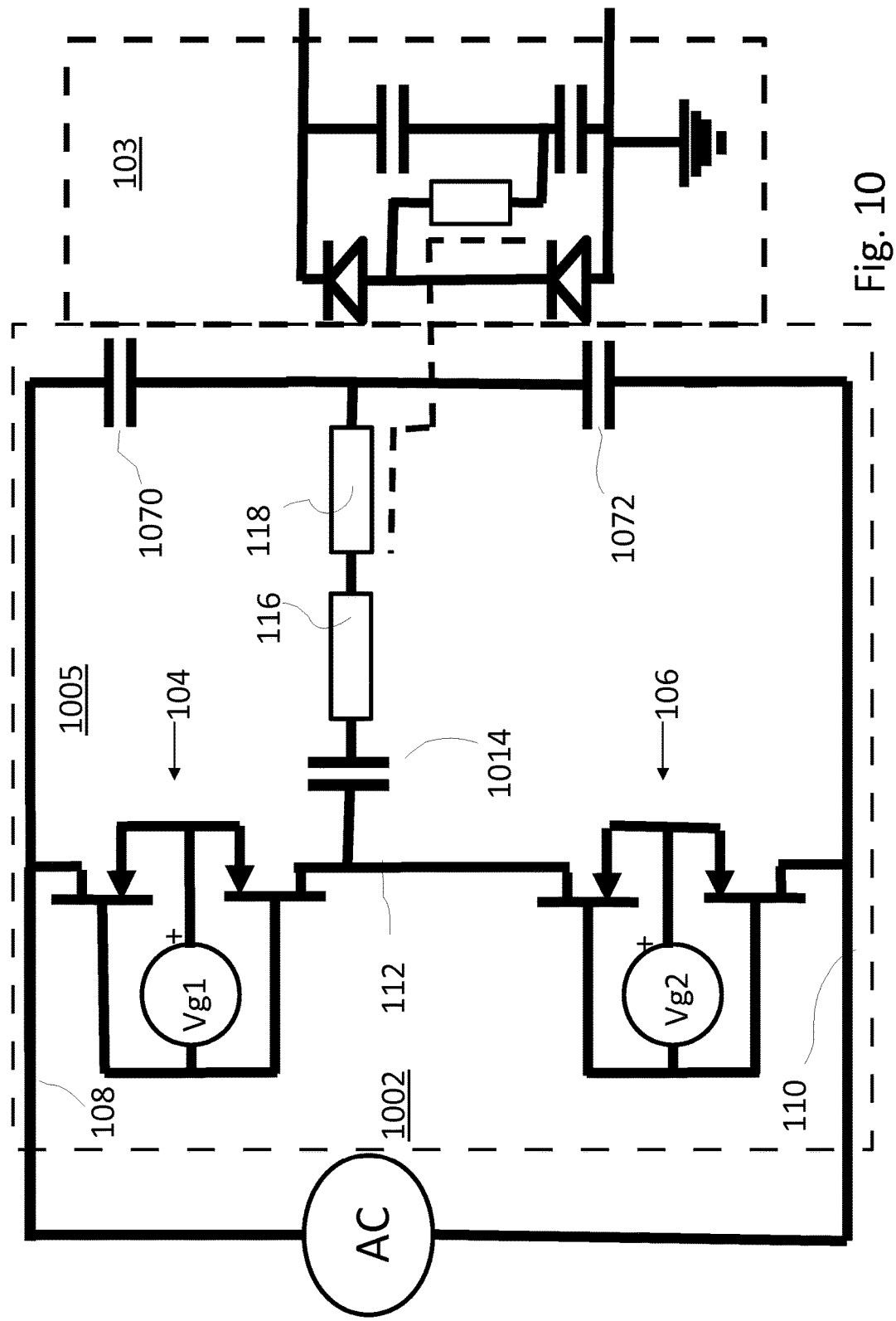
FIG. 10 illustrates a balanced capacitor implementation of FIG. 1.

Using the LLC stage as the first stage after the line is also consistent with smaller differential-mode filtering component needs. This reflects the fact that an LLC resonant converter can operate in practice at very much higher frequencies than is the case with a conventional line-fed boost stage, and further with ripple-frequency doubling when a balanced half-bridge capacitor approach is employed as shown in FIG. 10 in which the primary side 1002 comprises switches 104, and 106 as previously described in a half bridge configuration with an LLC circuit. The LLC resonant circuit comprises three capacitors; the first 1014 is as previously described with the second and third capacitors 1070 and 1072 being connected to AC nodes 108 and 110. It will be appreciated that the second and third capacitors are effectively in parallel and that the capacitance of the LLC circuit is the aggregate capacitance of the first capacitor in series with the parallel capacitance of the second and third capacitors. This approach balances the converter from an EMI perspective and improves its EMI performance allowing for a smaller EMI filter.

The approach is not restricted to the bidirectional half bridge switching arrangement and it will be appreciated that the balanced approach may also be employed in the rectifier bridge and unidirectional switches. Such a configuration is shown in FIG. 11. Equally, it is not restricted to use with a single LLC circuit as is also demonstrated in FIG. 11.

It will be appreciated that whilst several different embodiments have been described herein, the features of each may be advantageously combined together in a variety of forms to achieve advantage and that variations are possible.

In the foregoing specification, the application has been described with reference to specific examples of embodiments. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present application is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention. It will be understood that whilst particular polarity devices, e.g. PMOS, NMOS, PNP or NPN may be illustrated in the figures, that alternative polarity devices may be employed by appropriate modification of the circuits.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments. Equally, whilst the claims are directed to an isolated gate drive or reset circuit for same, the application is not to be construed as being so limited and extends to a method for doing same.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A switching converter for converting an input AC voltage to an output DC voltage, comprising:
    a primary side, the primary side comprising:
    first and second AC input nodes for receiving the input AC voltage or a rectified AC input voltage:
    a first switch having a first end connected to the first AC input node and a second end connected to a common switching node;
    a second switch having a first end connected to the common switching node and a second end connected to the second AC input node;
    a first resonant circuit comprising a capacitor in series with a primary winding of a first transformer, wherein the first resonant circuit is provided between the common switching node and the second AC input node, wherein the first resonant circuit has a first pair of resonant frequencies comprising a first series resonant frequency and a first parallel resonant frequency;
    a secondary side comprising a secondary winding of the first transformer and at least one rectifier for rectifying a voltage from the secondary winding,
    a second resonant circuit provided between the common switching node and the second AC input node, the second resonant circuit comprising a second primary winding of the transformer, wherein the second resonant circuit has a second pair of resonant frequencies comprising a second series resonant frequency and a second parallel resonant frequency; and
    a controller for operating switches, wherein the controller is configured to operate the switches using a variable frequency, wherein the controller has a first mode of operation in which a switching frequency is confined to a first frequency range and a second mode of operation in which the switching frequency is confined to a second frequency range.

2. The switching converter according to claim 1, further comprising a DC-DC switching circuit accepting the rectified voltage from the secondary winding and providing a DC output.

3. The switching converter according to claim 2, wherein the DC-DC switching circuit comprises a first boost converter.

4. The switching converter of claim 3, wherein the switching converter is configured to provide power factor correction by control of the first boost converter.

5. The switching converter according to claim 3, wherein the DC-DC switching circuit comprises a buck converter.

6. The switching converter according to claim 1, further comprising a hold-up circuit for holding up the DC output voltage, wherein the hold-up circuit comprises a hold-up capacitor providing a hold-up voltage to a hold up switching circuit which in turn provides energy to the switching converter.

7. The switching converter according to claim 6, wherein the hold-up circuit is provided on the secondary side in parallel with a smoothing capacitor.

8. The switching converter according to claim 6, wherein the hold-up circuit is provided on the primary side and where the hold-up circuit comprises a secondary winding of the first transformer and where the hold-up circuit is arranged to charge the hold-up capacitor.

9. The switching converter according to claim 1, wherein the first series resonant frequency is greater than the first parallel resonant frequency.

10. The switching converter according to claim 1, wherein the second series resonant frequency is greater than the second parallel resonant frequency.

11. The switching converter according to claim 10, wherein the first parallel resonant frequency is greater than the second series resonant frequency.

12. The switching converter according to claim 1, wherein the second primary winding is a tapped output from the first primary winding.

13. The switching converter according to claim 12, wherein a turns ratio between the first primary winding and the second primary winding is in a range of 4:1 to 3:2.

14. The switching converter according to claim 1, wherein the first resonant frequency pair define a width of the first frequency range.

15. The switching converter according to claim 1, wherein the second resonant frequency pair define a width of the second frequency range.

16. The switching converter according to claim 1, wherein a ratio between a centre frequency of the first frequency range and a centre frequency of the second frequency range is between 2 and 8.

17. The switching converter according to claim 16, wherein the ratio between the centre frequency of the first frequency range and the centre frequency of the second frequency range is between 3.5 and 4.5.

18. The switching converter according to claim 1, wherein the controller has a start-up mode of operation in which the start-up mode of operation is within a frequency range which is higher than the first frequency range and the second frequency range.

19. The switching converter according to claim 1, further comprising a transient detector for detecting a transient on the input AC voltage and in response thereto ensuring that the first and second switches are switched off.

20. The switching converter according to claim 1, wherein the first resonant circuit is an LLC circuit.

21. The switching converter of claim 1, further comprising:
   a smoothing capacitor provided for smoothing a ripple voltage arising from the sinusoidal nature of an AC voltage; and
   a hold-up circuit for holding up the DC output voltage in the event of a transient event on the AC input voltage, the hold-up circuit comprising:
      a hold-up capacitor providing a hold-up voltage to a hold-up switching circuit which in turn provides energy to the switching converter to effect hold-up of the DC output voltage,
   where the hold-up capacitor and smoothing capacitor are not provided by the same capacitor, wherein the hold-up switching circuit is activated in response to a voltage falling below a predetermined level.

22. The switching converter according to claim 21, wherein the hold-up circuit is provided on the secondary side in parallel with the smoothing capacitor.

23. The switching converter according to claim 21, wherein the hold-up circuit is provided on the primary side and the smoothing capacitor is provided on the secondary side.

24. The switching converter according to claim 21, wherein a capacitance of the smoothing capacitor is less than a capacitance of the hold-up capacitor and where an equivalent series resistance of the smoothing capacitor is less than that of the hold-up capacitor.

25. A method for converting an input AC voltage to an output DC voltage, the method comprising:
   connecting a primary side, including connecting first and second AC input nodes to the input AC voltage or a rectified AC input voltage;
   connecting a first switch having a first end to the first AC input node and a second end connected to a common switching node;
   connecting a second switch having a first end to the common switching node and a second end connected to the second AC input node;
   providing a first resonant circuit comprising a capacitor in series with a primary winding of a first transformer, wherein the first resonant circuit is provided between the common switching node and the second AC input node wherein the first resonant circuit has a first pair of resonant frequencies comprising a first series resonant frequency and a first parallel resonant frequency;
   connecting a secondary side comprising a secondary winding of the first transformer and at least one rectifier for rectifying a voltage from the secondary winding;
   providing a second resonant circuit between the common switching node and the second AC input node, the second resonant circuit comprising a second primary winding of the transformer, wherein the second resonant circuit has a second pair of resonant frequencies comprising a second series resonant frequency and a second parallel resonant frequency; and
   operating the first and second switches using a variable frequency, wherein the operating has a first mode of operation in which a switching frequency is confined to a first frequency range and a second mode of operation in which the switching frequency is confined to a second frequency range.

* * * * *